SEMI-CONDUCTOR ADDER

Filed Dec. 31, 1953

INVENTOR
ROBERT L. GRAY
BY
Ralzemond B. Parker
ATTORNEY 2,892,099
Patented June 23, 1959

2,892,099

SEMI-CONDUCTOR ADDER

Robert L. Gray, Broomall, Pa., assignor to Burroughs Corporation, Detroit, Mich., a corporation of Michigan Application December 31, 1953, Serial No. 401,685

2 Claims. (Cl. 307—88.5)

This invention relates generally to coincidence type adding circuits and more particularly to coincidence type adding circuits employing semi-conductor devices.

Semi-conductor devices are known which may be used in amplifier, oscillator or modulator circuits. Such a device which is usually called a transistor may include a semi-conducting body and at least three electrodes called the base, emitter and collector electrodes which are in contact with the body. The semi-conducting body may, for example, consist of a crystal of silicon, germanium or the like. The base electrode, which may consist of a piece of suitable metal such as brass soldered to the crystal, is in a low resistance contact with the crystal to control the potential of the bulk of same. The emitter and base electrodes are in rectifying contact with the crystal and when the device is operated as an amplifier, the emitter is biased in the forward direction and the collector in the reverse direction with respect to the base. If the crystal is of the N type, the emitter should be positive and the collector negative with respect to the base. If the crystal is of the P type crystal, a reversal of electrode potential would be required.

In order to perform an addition of two numbers in any radix system, an addend digit, an augend digit, and a previous-carry digit must be summed. It has been found that these three digits may be added either as pairs in two separate steps or simultaneously in one step. The term half-adder has been used to denote a system or device in which two digits are added. A half-adder delivers a sum and carry digit for each pair of digits which it receives. A device which employs two half-adders to perform an addition of three digits in two separate steps is termed a two-input adder. A device which adds the three digits simultaneously is referred to as a three-input adder and has two outputs, a sum and a carry.

These coincident type adding circuits may employ logical "and," "or" and "inhibit" circuits arranged in a predetermined logical manner to produce the type of adding circuit desired. In a half-adder circuit, for example, the signal may be attenuated by the time it arrives at the "inhibit" circuit and after passing through the "inhibit" circuit it has been found that the signal may require amplification so as to result in a useful output signal. The "inhibit" circuits employed in the past consisted of purely passive elements such as diodes, transformers, delay lines and the like. Accordingly, it is desired to combine the function of "inhibition" and amplification in a single unitary device wherein simplification of circuitry will result.

It is, therefore, a general object of the invention to provide an improved adding circuit.

It is another important object of the invention to provide an improved coincidence type adding circuit employing a semi-conductor device.

It is a further important object of the invention to provide an improved high-speed coincidence type adding circuit including a semi-conductor device which requires fewer circuit elements than conventional adding circuits.

It is a still further important object of the invention to provide an improved binary adding circuit wherein a semi-conductor device is employed in a novel manner to produce the logical function of "inhibition" and amplification wherein a simplified, reliable adding circuit results.

The above and related objects are achieved by providing logical networks arranged in a novel manner with the emitter and base electrodes of a semi-conductor device, arranged as an amplifier, to control the output of the collector electrode of same. Through the appropriate choice of circuit parameters for the logical networks, the input pulses are controlled to arrive at the emitter and base electrodes at substantially the same time and thereby control the collector output resulting in the desired "inhibit" action.

Other objects, advantages and meritorious features of the present invention will be found throughout the following more detailed description of the invention, particularly when considered with the accompanying drawings in which like reference characters refer to similar elements.

Figure 1:
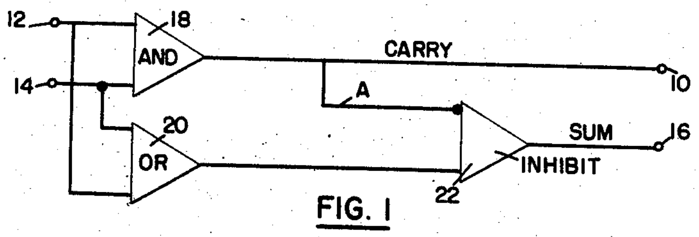
Fig. 1 is a logical block diagram of a half-adder circuit constructed in accordance with the invention.

Referring now to Fig. 1, the logical block diagram of a typical half-adder circuit constructed in accordance with the invention will be described. As hereinbefore described, a half-adder denotes a device for adding two digits comprising logical "and," "or" and "inhibit" circuits arranged to control the two output terminals, the sum and the carry. The input leads 12 and 14 are coupled to the "and" network 18 and the "or" network 20. The network 18 is coupled to the carry output terminal 10 and the "inhibit" circuit 22. The "or" network 20 has its single output coupled to the "inhibit" circuit 22. Binary addition is well adapted to electronic computation as it may be seen that 1 and 0 may be denoted by the presence or absence of a pulse. On this basis, the above described logical networks have been arranged to produce an output pulse at the carry output terminal 10 when pulses appear on both the input terminals 12 and 14. Also an output pulse will appear at the sum output terminal 16 when a pulse appears at either terminal 12 or 14 but not 12 and 14. The above rules may be stated in formula form as follows:

Carry (10)=input 12 and input 14
Sum (16)=input 12 or 14 but not inputs 12 and 14

The latter formula illustrates the "inhibit" action in the "but not inputs 12 and 14" portion. The lead "A" coupling the "and" circuit 18 to the inhibit circuit 22 is the lead that controls the "inhibit" action.

Figure 2:
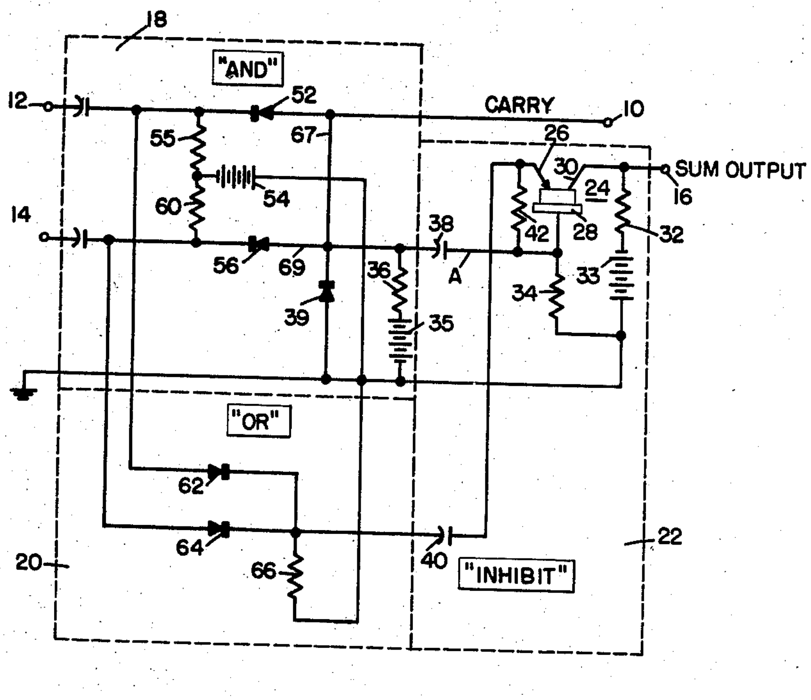
Fig. 2 is a circuit diagram of a half-adder circuit constructed in accordance with the invention.
Figure 3:
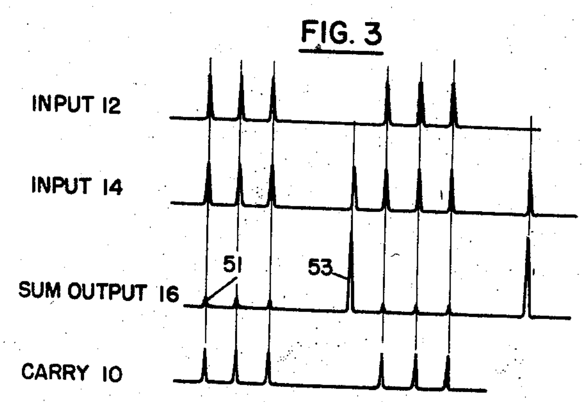
Fig. 3 is a graphical representation of typical waveforms employed throughout the invention.
Figure 4:
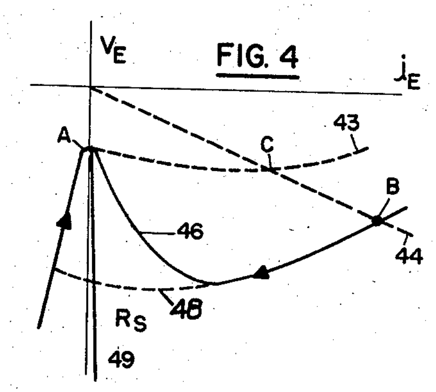
Fig. 4 is a graphical representation of typical characteristics of a semi-conductor device employed in the invention.

Referring now to Figs. 2, 3, and 4, the circuit details of a typical half-adder circuit constructed in accordance with the logical block diagram of Fig. 1 will be explained. As hereinbefore explained, the half-adder circuit comprises the "and" network 18 and an "or" network 20 and the "inhibit" network 22. The "inhibit" network 22 comprises the semi-conductor device 24 so arranged that by properly controlling the emitter electrode 26 and the base electrode 28 the output of the collector electrode 30 may be controlled. The collector electrode 30 may be directly connected to the sum output terminal 16 of the adding circuit and is negatively biased by means of the current limiting resistor 32 and the voltage source 33, The base electrode 28 is connected to the positive terminal of the voltage source 33 through the resistor 34 and is also coupled by the capacitor 38 to the "and" network 18, which will be described in more detail hereinafter. The emitter electrode 26 is coupled to the "or" network 20 by means of the capacitor 40. The resistor 42 common to the emitter electrode 26 and the base electrode 28 is utilized to reduce the static emitter load line slope from infinity to some finite negative value as is more clearly evident in the graphical illustration of Fig. 4 wherein the static load line is identified by the reference numeral 49.

It has been found that the value of the resistor 42 must be sufficiently small to insure that the emitter time constant will be within the limits to permit the signal pulse from the "or" circuit 20 to arrive at the emitter electrode 26. Recalling that the emitter electrode 26 has been arranged in the reverse direction when in its quiescent state, a pulse delivered to the emitter from the "or" circuit 20 would have to begin to charge the capacitor 40 through the back emitter resistance which may be very large. Therefore, the resulting time constant may be greater than the pulse width, resulting in no signal being delivered to the emitter 26, if resistor 42 were not provided.

Assuming, for the present, the action of the "and" network 18 and the "or" network 20 in distributing pulses to their respective electrodes, the action of the semi-conductor device 24 to produce the "inhibit" action will be explained. When a triggering pulse is applied to both the input terminals 12 and 14 and output pulse is desired at the carry output terminal 10 but not at the sum output 16. The latter output pulse is produced by triggering the base electrode 28 of the semi-conductor device 24. Upon the application of the triggering pulse to the base electrode 28 it effectively short circuits the base feed back resistor 34 by means of the diode 39 thereby reducing the negative resistance slope of the emitter characteristic curve, as indicated by the dotted line 43 in Fig. 4. Now referring to the emitter electrode 26 of the semi-conductor device 24, the action resulting when a triggering pulse is delivered to the emitter electrode 26 by the "or" network 20 will be explained. If a pulse is delivered to the emitter 26 the dynamic load line may be the pulse source impedance as indicated by the dotted line 44 in Fig. 4. Therefore, when a pulse is applied, the operating point jumps from point A to point B thereby producing an output pulse. The change in emitter voltage to produce this ouput may be seen by projecting point B to the left until it intersects the static emitter lead line 49. The operating point then moves along the curve 46 indicated by the arrowheads thereon, jumping across a portion of the curve as indicated by the dotted line 48 and again following the curve 46 until it reaches point A. The jump from point B to A is caused by the negative resistance characteristic of the emitter electrode 26.

When pulses are applied at both the emitter 26 and the base 28 it is desirable that there will be substantially no output pulse appearing at the terminal 16. It has been found that when the two electrodes are so pulsed the emitter never becomes positive with respect to the base and therefore substantially no output pulse appears and the desired result is obtained. The operating point under these conditions may be indicated by the intersection of the line 43, resulting from pulsing the base, and the line 44, the emitter pulse source impedance. The point of intersection is referred to as point C. By projecting point C to the left, the change in the emitter potential may be observed and this change causes an output pulse of relatively small amplitude to be produced. The resulting output pulse is indicated by the reference character 51 as opposed to the output pulse 53 produced when only the emitter 26 is pulsed. More specifically, it has been found that it is necessary that the negative resistance portion of the curve 46 be lost prior to the operating point shifting to point B to prevent an output pulse.

The operation of the logical "and" and "or" networks 18 and 20 respectively, in distributing the triggering pulse to the appropriate electrodes of the semi-conductor 24 will now be explained. The "and" network 18 is connected directly to the carry output terminal 10 and is also coupled to the base electrode 28 by means of the capacitor 38. The input terminal 12 is coupled to the carry output terminal 10 through the diode 52. The cathode electrode of the diode 52 is connected to the negative terminal of the voltage source 54 through the current limiting resistor 55. The anode electrode of the diode 52 is coupled to the voltage source 35 by means of the resistor 36. The input terminal 14 is coupled to the base electrode 28 through the diode 56 and the capacitor 38. The diode 56 is biased in the same sense as the diode 52 by the voltage sources 35 and 54 through their respective resistors 36 and 60. The diode 39 is connected in parallel with the resistor 36 and the voltage source 35, the latter biasing the diode in a non-conducting polarity. However, diode 39 is kept in the conducting state so long as either or both of diodes 52 and 56 are conducting current. The "or" network 20 which may also be controlled by the input terminals 12 and 14 comprises the diodes 52 and 64 and the resistor 66. The diodes each may have their anode electrodes connected to one of the input terminals and both may have their cathode electrodes connected to the coupling capacitor 40 and one end of the resistor 66. The opposite end of the resistor 66 is connected to the positive voltage terminal of the voltage source 54. The diodes 62 and 64 are both biased off by the voltage source 54.

The diodes 52 and 56 are biased as hereinbefore described so that in the absence of any input pulses they are conducting. The current path of the diode 52 is through the resistor 55, voltage source 54, the parallel branches, consisting of diode 39 as one branch and the series combination of the voltage source 35 and resistor 36, and back to the diode 52 by means of the lead 67. Similarly the current path of the diode 56 is through the voltage source 54 by means of the resistor 60, through the parallel branches and back to the diode 56 by means of the lead 69. When pulses are simultaneously delivered to the input terminals 12 and 14 of sufficient amplitude to cut off the current flow through the diodes 52 and 56, diode 39 is cut off by the biasing potential from voltage source 35 through resistor 36, allowing the full potential of voltage source 35 to appear on lead 69. In this manner an output pulse will be produced at the carry output terminal 10. The output pulse amplitude tends to follow the input pulse amplitude when the latter amplitude is less than the voltage source such as the source 35. Simultaneously the voltage rise is coupled to the base electrode 28.

The input pulses are also coupled to the "or" network 18 and to the diodes 62 and 64 which are initially biased off as hereinbefore described. An input pulse of sufficient amplitude delivered to the appropriate input terminal 12 or 14 will allow either of the diodes 62 and 64 to conduct and thereby a pulse may be coupled to the emitter electrode 26. This pulse is developed across resistor 66 and resistor 66 also allows the capacitor 40 to discharge therethrough. However, when pulses are delivered to both input terminals 12 and 14, the delivery of the pulse to the emitter electrode is substantially in coincidence with the arrival of the pulse at the base electrode, and no output appears at sum output 16.

While it will be understood that the circuit specifications of the adding circuit of the invention may vary according to the design for any particular application, the following circuit specifications for the circuit of Fig. 2 are included by way of example only:

| | | |
|---|---|---|
| Resistor 32 | ohms | 5600 |
| Resistor 34 | do | 6800 |

| | | |
|---|---|---|
| Resistor 36 | do | 22000 |
| Resistor 42 | do | 50000 |
| Resistor 55 | do | 18000 |
| Resistor 60 | do | 18000 |
| Resistor 66 | do | 22000 |
| Capacitor 38 | micromicrofarads | 10000 |
| Capacitor 40 | do | 10000 |
| Voltage source 33 | volts | 22.5 |
| Voltage source 35 | do | 22.5 |
| Voltage source 54 | do | 22.5 |

With the above specifications any of the commercial crystal diodes available such as type CK713 may be employed and a point contact semi-conductor device which is capable of current amplification, as the type commercially identified as 2N32 or G11A or the like, may be employed. The circuit has operated successfully at a frequency of 100 kilocycles with input pulses of 10 volts and 1 microsecond duration. The output pulse resulting was eight volts and the carry output was six volts, both of 1 microsecond duration. The circuit has operated successfully at a frequency up to 500 kilocycles.

It may be readily seen, although the invention has been described in conjunction with a half-adder circuit that the principles of the invention may readily be extended to be employed in two input adder circuits where the complete addition process is performed in two steps or may be utilized in three input adder circuits wherein the inputs are delivered simultaneously and is a one step operation. Other extensions of this device will be readily apparent to those skilled in the art.

It is, therefore, readily apparent that the instant invention has advanced the state of the art by providing a novel adding circuit wherein a single semi-conductor device is employed to produce the logical functions of "inhibition" and amplification in a novel circuit arrangement whereby reliable high-speed addition is possible with fewer circuit elements.

What is claimed is:

1. A logic half adder, comprising, a first input terminal, a second input terminal, a carry output terminal and a sum output terminal; an "and" gate having two input terminals and an output terminal; an "or" gate having two input terminals and an output terminal; first circuit means connecting the two input terminals of the half adder respectively and in parallel to the two input terminals of the "and" and "or" gates; second circuit means connecting the output terminal of the "and" gate to the carry terminal; an inhibit circuit comprising a semi-conductor amplifying device having an emitter, a base and a collector, said transistor being characterized by a negative emitter characteristic; a first resistor connected between the emitter and base of said transistor, a second resistor connected between the base of the transistor and a point at reference potential, a third resistor having one terminal connected to the collector and the other terminal adapted to be connected to a suitable source of collector potential; conductive means directly connecting the collector to the sum terminal; alternating current coupling means for connecting the emitter to the output terminal of the "or" gate and alternating current coupling means for connecting the base to the output terminal of the "and" gate.

2. A logic half adder as defined in claim 1 wherein said transistor is of the point contact type.

References Cited in the file of this patent

UNITED STATES PATENTS

| | | |
|---|---|---|
| 2,557,729 | Eckert | June 19, 1951 |
| 2,629,834 | Trent | Feb. 24, 1953 |
| 2,636,133 | Hussey | Apr. 21, 1953 |
| 2,644,896 | Lo | July 7, 1953 |
| 2,660,624 | Bergson | Nov. 24, 1953 |
| 2,666,139 | Endres | Jan. 12, 1954 |
| 2,670,445 | Felker | Feb. 23, 1954 |
| 2,675,474 | Eberhard | Apr. 13, 1954 |
| 2,718,613 | Harris | Sept. 20, 1955 |

OTHER REFERENCES

Proceedings of the IRE, "The Binac," January 1952, pages 12–28; author Auerbach et al.